Patented Oct. 23, 1928.

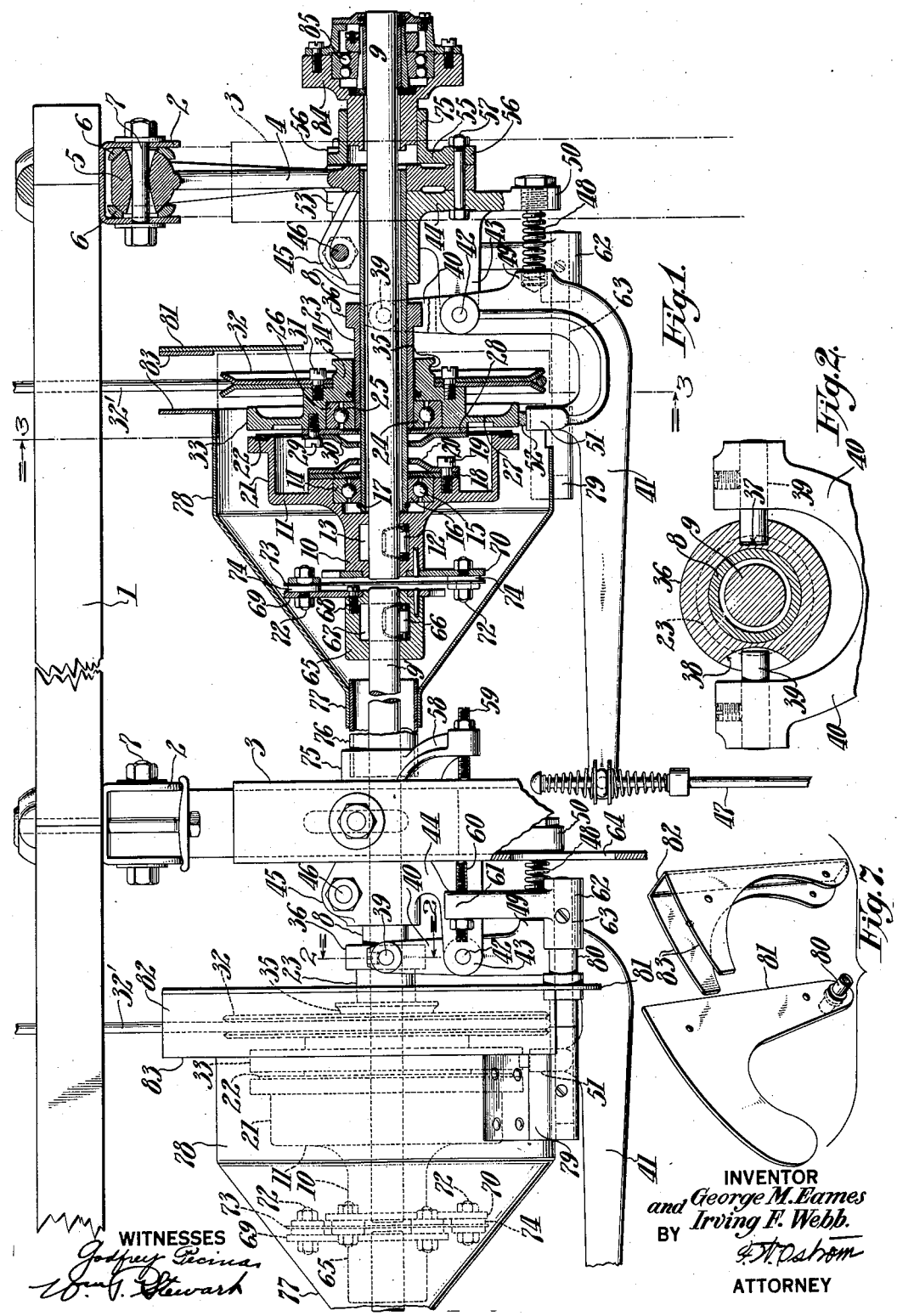

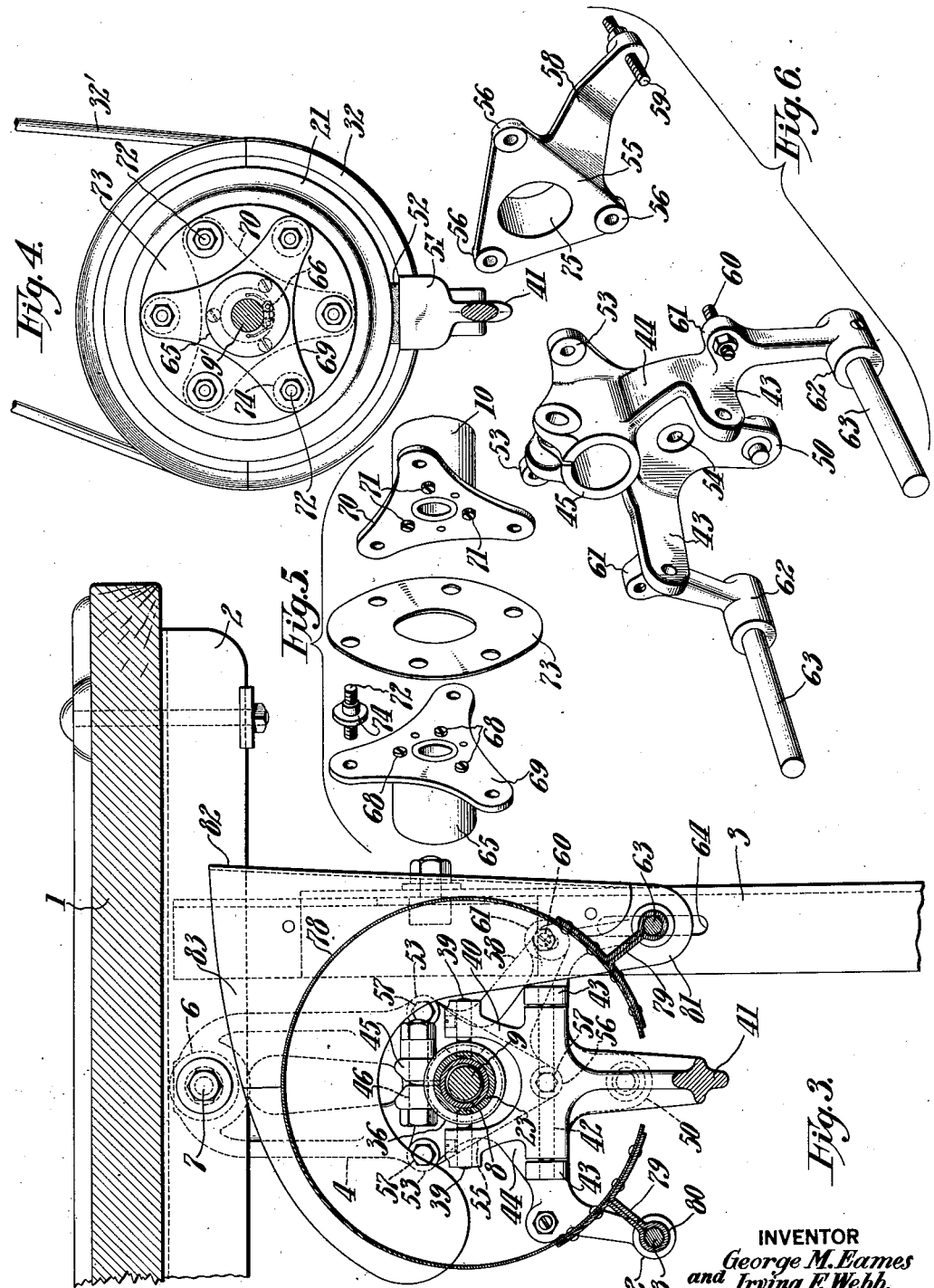

1,688,414

UNITED STATES PATENT OFFICE.

GEORGE M. EAMES, OF BRIDGEPORT, CONNECTICUT, AND IRVING F. WEBB, OF ELIZABETH, NEW JERSEY, ASSIGNORS TO THE SINGER MANUFACTURING COMPANY, OF ELIZABETH, NEW JERSEY, A CORPORATION OF NEW JERSEY.

POWER TRANSMITTER.

Application filed May 27, 1925. Serial No. 33,261.

This invention relates to power-table transmitters for controlling the operation of machines, such as sewing machines and the like, and more particularly to that class of power-tables in which a series of machines are driven from a rotating shaft beneath the machine-supporting table.

The present invention has for an object to provide improved supporting means for the rotating driving-shaft, of a character facilitating installation of a power-table equipment and reducing to a minimum the amount of power consumed in the operation of each individual machine and in the idle rotation of the driving shaft. A further object of the invention is to provide a power-transmitter construction of a universal character throughout, whereby the parts thereof including the transmitter-guard may be installed in a power-table equipment as either a left-hand or a right-hand transmitter. The invention has for another object to provide a power-transmitter construction which will eliminate the imparting of objectionable end thrusts to the rotating driving shaft and which will insure a quick pick-up of power-transmission without imparting an undue torsional action upon the driving shaft and the driving elements secured thereto.

Other and more specific objects of this invention will be apparent from the following description and claims.

In its preferred embodiment, a multiple-section machine supporting table is clamped to the upper rails of standards or legs of each section. Secured for universal adjustment to the table-supporting rails are depending hangers each carrying a bearing-sleeve surrounding but not contacting with a driving-shaft section disposed in end-to-end relation with the driving-shaft section similarly disposed in the bearing-sleeve of the adjacent hanger. Adjacent the free end of a bearing-sleeve, the end of the driving-shaft section surrounded thereby is secured to the overhanging hub of a driving clutch-member and fly-wheel journaled upon the bearing-sleeve through the intermediary of a deep-groove ball-bearing, constituting a combined thrust and journal-bearing. To this end the inner race-ring of this ball-bearing is held against movement upon the bearing-sleeve whereby the clutching-thrust upon the driving clutch-member is absorbed by the bearing-sleeve and the deep-groove ball-bearing referred to, and is not transmitted to the driving-shaft. The adjacent driving-shaft sections are connected by a flexible-disk coupling interposed between the hub of the driving clutch-member of one shaft-section and the end of the adjacent shaft-section. Consequently, one end of a shaft-section has a ball-bearing journal on a shaft surrounding bearing-sleeve and the other end of said shaft-section is floatingly supported by a member journaled upon an adjacent bearing-sleeve. It is evident that in a construction of this character it is not essential to carefully aline the shaft-sections and still obtain a smooth-drive requiring a minimum of power.

A driven clutch-member has a ball-bearing journal upon a shifting-sleeve slidingly disposed upon each of the bearing-sleeves, each of said driven clutch-members being adapted to be placed into and out of driving relation with the driving clutch-member upon the same bearing sleeve by means of a treadle-controlled shift- and brake-lever. This lever has a fork engaging the shifting-sleeve and is fulcrumed upon a bracket-member clamped upon the bearing-sleeve at one side of the hanger. A complemental bracket-member is secured upon the opposite side of the hanger, which hanger may be angularly adjusted about its universal support by means interposed between said bracket-members and a table - standard. The bracket - member clamped upon the bearing-sleeve is so constructed as to be capable of operatively supporting said treadle-controlled lever for either a right or left-hand transmitter and also supports in the same manner one end of a transmitter-guard of which the opposite end is sustained by the complemental bracket-member of the adjacent hanger.

In the accompanying drawings, Fig. 1 is a view in elevation and partly in section of a portion of a power-table constituting a preferred embodiment of the present improvement, the table being broken to more closely group the adjacent transmitters. Fig. 2 is a view substantially on the line 2—2 of Fig. 1. Fig. 3 is a view substantially on the line 3—3 of Fig. 1. Fig. 4 is an elevation of a transmitter as viewed from the left in Fig. 1, the transmitter-guard being omitted. Fig. 5 is a perspective view of the shaft-coupling, with the parts thereof in detached relationship. Fig. 6 comprises perspective views of the complemental bracket-members for supporting the clutch-shifting lever and the transmitter-guard. Fig. 7 is a perspective view of the parts of the pulley-guard shown in detached relationship.

Referring to the drawings, to the under side of a sectional machine-supporting table 1 are suitably clamped inverted U-shaped rails, as 2, sustained by the two-part standards 3 which are vertically adjustable for raising or lowering the level of the table 1. Each of the rails 2 may support one or more depending hangers 4 in a manner permitting a universal positioning movement of the free end of the hanger. For this purpose, the upper end of each hanger is formed with a rounded head 5, between which and the depending members of a rail 2 are interposed concave-faced washers 6. The head 5 is pivotally supported in reversible position by a bolt 7, secured upon the rail 2 and passing through enlarged apertures in the washers 6. Each hanger 4 is apertured at its free end to receive the end of a stationary, substantially horizontal bearing-sleeve 8 projecting from the hanger at one side thereof. Each bearing-sleeve 8 constitutes supporting means for a sectional driving-shaft and the driving and driven clutch-members of a power-transmitter. As the power-transmitters are duplicates of each other, the description of one applies to all.

Disposed within a bearing-sleeve 8 but free of contact therewith is a sectional driving-shaft section 9 extending beyond said sleeve at its opposite ends. Secured upon the shaft-section 9 adjacent the free end of the bearing-sleeve 8 is the overhanging hub 10 of a driving clutch-member 11. Any suitable means may be employed to secure the driving clutch-member hub upon its shaft-section, but it is preferred to employ a commercial form of clutch-coupling 12 disposed within a recess 13 provided in the hub 10. Seated within a recess provided in the driving clutch-member 11 is the outer race-ring 14 for the balls 15 of a deep-groove ball-bearing of which the inner race-ring 16 is fixed upon the bearing-sleeve 8, whereby a journal is provided for the driving clutch-member 11 and the shaft-section 9 upon the sleeve 8. In addition to its journaling function, the deep-groove ball-bearing referred to constitutes a thrust bearing, as the inner race-ring 16 is held against movement in the direction toward the free end of the sleeve by any suitable means such as a stop-ring 17 embedded upon said sleeve. The outer race-ring 14 is held secured upon the member 11 by a clamp-plate 18 fastened by screws, as 19, which also serve to secure a lubricant-packing retaining-plate 20, both of said plates having enlarged sleeve-clearance apertures to permit of slight angular positioning movements of the clutch-member 11 upon its journal-bearing. It will therefore be understood that while one end of the driving-shaft section 9 is journaled upon the bearing-sleeve 8, the axis of said shaft is not necessarily confined to exact parallelism with the bearing-sleeve, a fact which facilitates installation of a power-table equipment. The clutch-member 11 is formed with a flanged rim 21 faced with a suitable friction-ring 22, said rim having sufficient weight to give to the clutch-member the effect of a fly-wheel.

Slidingly disposed upon the bearing-sleeve 8 is a shift-sleeve 23 upon which is suitably fixed the inner race-ring 24 for the balls 25 of another deep-groove ball-bearing, of which the outer race-ring 26 is secured in a recessed seat provided in a driven clutch-member 27, said outer race-ring being secured in position by a clamp-plate 28. The clamp-plate 28 is secured by screws, as 29, which also serve to fasten a lubricant-packing retaining-plate 30. Detachably secured by screws, as 31, upon the driven clutch-member is a belt-pulley 32 preferably comprising two sections of sheet-metal disks having bent margins to together produce the effect of a V-groove for the reception of the usual machine-driving belt 32'. The driven clutch-member 27 has a widened periphery 33 to serve as a brake-surface, and is formed with a hub 34 surrounding but not contacting with the shift-sleeve 23, whereby a slight self-adapting angular movement of said clutch-member 27 is permitted upon its journal bearing to make a more effective contact with the driving clutch-member, when said members are relatively shifted into effective driving relationship. The hub 34 is formed with a belt-groove 35 to provide for the employment, if desired, of an extremely small pulley.

The shift-sleeve 23 has at one end a flange 36 provided at one side with a rounded aperture 37 and diametrically opposite thereto with a segmental slot 38, which aperture and slot are entered by trunnions 39 suitably secured upon the forked arms 40 of an angular shift-lever 41. The sleeve 23 is securely held against rotation by the interengagement of a trunnion 39 with the aperture 37, while the provision of the slot 38 facilitates alinement of the parts when installed. The shift-lever 41 is fulcrumed upon a pin 42 supported by the spaced arms 43, disposed at equal distances upon opposite sides of a vertical plane through the longitudinal center of the bearing-sleeve 8, said arms 43 projecting from a bracket-member 44 having a split-hub 45 clamped by a screw-bolt 46 upon the bearing-sleeve 8. The shift-lever 41 is yieldingly connected at its free end with a rod 47 adapted to be actuated by a suitable treadle (not shown), a spring 48 being interposed between a socketed boss 49 of said lever and a depending arm 50 on the bracket-member 44 to return the driven clutch-member to its initial position after treadle actuation of the lever 41 to bring the clutch-members into driving relationship. The lever 41 is formed with an upstanding lug 51 provided on its upper face with a brake-material 52 adapted to frictionally engage the periphery 33 of the clutch-member 27 in its retracted or non-driving position.

The bracket-member 44, upon opposite sides of its split-hub 45, is formed with apertured bosses 53 and is also provided with a bolt-aperture 54 below the hub 45. Disposed upon the side of the hanger 4 opposite to that occupied by the bracket-member 44 is a complemental bracket-member 55 having triangularly arranged, flat-faced apertured bosses, as 56, entered by bolts, as 57, passing through suitable apertures in the hanger 4 and through the described apertures in the bracket-member 44, whereby said bracket-members are firmly secured upon opposite sides of the hanger 4. The bracket-member 55 is provided with a bent arm 58 carrying at its free end an adjusting screw 59 engaging one side of the standard 3 of which the opposite side is engaged by the opposed adjusting-screw 60 threaded into an ear 61 provided on the bracket 44. By manipulating said adjusting screws 59 and 60, the free end of the hanger 4 may evidently be readily adjusted in directions longitudinally of the shaft-section 9 to assist in bringing the bearing-sleeve 8 into proper position. Each of the arms 43 terminates in an apertured boss 62 in each of which is secured a guard-supporting rod 63. In the installation of a transmitter equipment, one of said rods 63 is brought into alinement with a vertical slot 64 provided in the standard 3, whereby the position of the sleeve 8 is accurately located laterally.

The shaft-section 9 is flexibly coupled with the adjacent end of a shaft-section 9' supported at its opposite end by a driving clutch member in the same manner as is shaft-section 9, it being understood that a plurality of power-transmitters are driven from the same sectional driving shaft and that the shaft-sections are all similarly supported and controlled as to operation. Upon the end of the shaft-section 9' adjacent shaft-section 9 is secured a clutch-ring 65 by means of a clutch-coupling 66 disposed in a clutch-ring recess 67. Secured upon the clutch-ring 65 by screws as 68 and suitable dowel-pins is a three-armed spider 69 which is similar to a spider 70 secured by screws as 71 and suitable dowel-pins upon the hub 10 of the driving clutch-member 11. The outer ends of the spider-arms are perforated for the reception of bolts 72 by means of which the arms are secured to a flexible disk-ring 73. but held spaced therefrom by spacing-washers 74 formed integral with or otherwise provided upon said bolts 72 to permit torsional play or movement of the disk-ring 73. The spider-arms of the two spiders are circumferentially displaced with respect to each other and are therefore alternately secured upon the disk-ring 73, as illustrated in Fig. 4. The described connection between the shaft-sections permits of their deflection from a straight line without destroying the direct positive driving connection between adjacent shaft-sections, it being borne in mind that the sole support for one end of the shaft-sections is the flexible or floating coupling between adjacent sections and that the other end of each shaft-section is journaled upon its encircling bearing sleeve.

The bracket-member 55 is provided with a cylindrical boss 75 encircling a shaft-section into which boss is inserted one end of a tube or shaft-guard 76 of which the opposite end is detachably fitted within the reduced end of a conical shield 77, surrounding the shaft-coupling and terminating in a cylindrical portion 78 surrounding the driving and driven clutch-members. The cylindrical portion 78 of the shield is slotted on its under side to provide clearance for the brake-lug 51 of the shift-lever 41, and projecting from said shield are apertured supporting-legs 79 adapted to be slidingly fitted upon the rods 63 of the bracket-member 44. Interposed between one of the legs 79 and a boss 62 of a bracket-arm 43 is the hub 80 of a supporting guard-member 81 to which is detachably secured a belt-guard 82 having similarly shaped spaced segmental side-walls 83, one of which overlies the cylindrical portion 78 of the transmitter-shield. Either of the side-walls 83 may obviously be secured to the guard 81 according to whether it is to be used with a right or left-hand transmitter.

It will be understood from the foregoing that the sleeve 8 and bracket-members 44 and 55 are reversible whereby the bearing-sleeve 8 may project from either side of the standard 3, i. e., to support either a left or right-hand transmitter. It will be noted also that no substitute transmitter parts need be employed for changing from a right-hand to a left-hand transmitter and that the only change in the parts employed is in the belt-guard as above described.

The shaft-section 9 is herein shown as the end section of the driving shaft, i. e., the short shaft-section at the end of the table. While this short section is capably supported at one end by the driving clutch-member, it is preferred to provide a steadying journal for the other end of said shaft-section. To this end, the boss 75 of the end bracket-member 55 is employed to sustain a journal-box 84 for a ball-bearing 85 of any suitable character.

Having thus set forth the nature of the invention, what we claim herein is—

1. In a driving device for power-tables, a driving shaft, a hanger, a bearing-sleeve sustained by said hanger and embracing said shaft, a driving clutch-member journaled upon said bearing-sleeve and secured upon said shaft for rotation therewith, a driven clutch-member rotatably supported upon said bearing-sleeve, means for shifting the driven clutch-member lengthwise of said bearing-sleeve into operative engagement with said driving clutch-member, and means provided on said bearing-sleeve for preventing the transmission of the thrust of said shifting means to said driving shaft.

2. In a driving device for power-tables, a driving shaft, a hanger, a bearing-sleeve sustained by said hanger and embracing said shaft, a driving clutch-member secured upon said shaft for rotation therewith, a ball-bearing journal for said clutch-member upon said sleeve, a driven clutch-member rotatably supported upon said sleeve, and means for shifting the driven clutch-member lengthwise of said sleeve into operative engagement with said driving clutch-member, said ball-bearing journal including a race-member secured against movement upon the bearing-sleeve in the direction of action of said shifting means.

3. In a driving device for power-tables, a driving shaft, a hanger, a stationary bearing-sleeve sustained by said hanger and embracing said shaft, a shifting-sleeve slidably mounted upon said bearing-sleeve, a driven clutch-member, a bearing for said driven clutch-member upon the shifting-sleeve permitting a tilting movement of said clutch-member with respect to said bearing-sleeve, a belt-pulley secured upon said member, a driving clutch-member journaled upon said bearing-sleeve and secured upon the driving-shaft for rotation therewith, and means for shifting said shifting-sleeve to establish and interrupt operative relation between said driving and driven clutch-members.

4. In a driving device for power-tables, a driving shaft, a hanger, a stationary bearing-sleeve sustained by said hanger and embracing said shaft, a shifting-sleeve slidably mounted upon said bearing-sleeve, a driven clutch-member having a hub embracing said shifting-sleeve, a deep-grooved ball-bearing constituting the bearing journal of said clutch-member hub upon the shifting-sleeve, a belt-pulley secured upon said clutch-member, and means for actuating said shifting sleeve to establish and interrupt driving relation between said driving shaft and said driven clutch-member.

5. In a driving device for power-tables, a driving-shaft, a hanger, a stationary bearing-sleeve sustained by said hanger and embracing said shaft, a shifting-sleeve slidably mounted upon said bearing-sleeve, a driven clutch-member having a hub embracing said shifting-sleeve, a deep-grooved ball-bearing interposed between said clutch-member hub and the shifting-sleeve, a driving clutch-member secured upon the driving-shaft for rotation therewith, a deep-grooved ball-bearing journal for said driving clutch-member secured upon the bearing-sleeve, and means for shifting said shifting-sleeve to establish and interrupt operative relation between said driving and driven clutch-members.

6. In a driving device for power-tables, a driving-shaft, a stationary bearing-sleeve encircling said shaft, supporting means for said bearing-sleeve, a flexible support for one end of said shaft, a driving clutch-member secured upon the other end of said shaft, a bearing-journal upon said sleeve for said driving clutch-member permitting tilting movements of said member with respect to the bearing-sleeve, and a driven clutch-member journaled upon said bearing-sleeve.

7. In a driving device for power-tables, a driving-shaft, a stationary bearing-sleeve encircling said shaft, supporting means for said bearing-sleeve, a flexible support for one end of said shaft, a driving clutch-member secured upon said shaft having a hub encircling said bearing-sleeve, a ball-bearing journal for the hub of said member upon the bearing-sleeve permitting the driving clutch-member to tilt with respect to said sleeve, a driven clutch-member journaled upon said bearing-sleeve, and means for at will shifting said driven clutch-member into driving engagement with the driving clutch-member.

8. In a driving device for power-tables, a plurality of hangers, a bearing-sleeve sustained by each of said hangers, a driving-shaft section disposed within but free of each of said bearing-sleeves, said driving-shaft sections being disposed in end-to-end relationship, a flexible driving coupling between said shaft-sections constituting a floating support for one end of the shaft-sections, a driving-clutch member journaled upon each bearing-sleeve constituting a support for the other end of said shaft-sections, a driven clutch-member journaled upon each bearing-sleeve, and means for establishing and interrupting operative relation between the clutch-members of each bearing-sleeve.

9. In a driving device for power-tables, a stationary bearing-sleeve, driving and driven clutch-members rotatably journaled upon said bearing-sleeve, a driving-shaft section disposed within but free of said sleeve and secured to said driving clutch-member, a driving-shaft section disposed in end-to-end relationship with said first named shaft-section, a flexible driving coupling between said shaft-sections, constituting a floating support for one end of said second named shaft-section and means for establishing and interrupting operative relation between said clutch-members.

10. In a driving device for power-tables, a stationary bearing-sleeve, supporting means for said bearing-sleeve, a driving-shaft section disposed within but free of said bearing-sleeve, a driven clutch-member rotatably and shiftably journaled upon said bearing-sleeve, a driving clutch-member rotatably journaled upon said bearing-sleeve having a hub secured upon said driving-shaft section to constitute a support for one end of said shaft-section, a driving-shaft section disposed in end-to-end relationship with respect to said first named section, a flexible disk-ring coupling interposed between said second named shaft-section and the driving clutch-member constituting a floating support for one end of said second named shaft-section, and means for establishing and interrupting operative relation between said clutch-members.

11. In a driving device for power tables, a table supporting standard, a hanger, a universal support for the hanger, a bearing sleeve sustained by said hanger, complemental bracket-members secured upon said hanger at opposite sides thereof, one of said bracket-members having a hub embracing said bearing sleeve, means interposed between the bracket-members and the standard for angularly adjusting said hanger upon its universal support, a driving shaft embraced by said sleeve, a driven clutch member journaled upon the bearing sleeve, a driving clutch member secured upon the shaft for rotation therewith, and a shift lever fulcrumed upon one of said bracket-members for establishing and interrupting driving relation between said clutch-members.

12. In a driving device for power-tables, a driving shaft, a stationary bearing-sleeve surrounding said shaft, supporting means for said sleeve, a shifting-sleeve slidably mounted upon said bearing-sleeve, a driven clutch-member, a bearing between the driven clutch-member and said shifting-sleeve, a driving clutch-member secured upon the driving shaft for rotation therewith, a bearing between the driving clutch-member and the bearing-sleeve, said driving and driven clutch-member bearings permitting a relative tilting movement between said clutch-members, and means for actuating said shifting-sleeve to establish and interrupt operative relation between the driving and driven clutch-members.

In testimony whereof, we have signed our names to this specification.

GEORGE M. EAMES.
IRVING F. WEBB.